(12) United States Patent
Itoigawa

(10) Patent No.: US 11,629,628 B2
(45) Date of Patent: Apr. 18, 2023

(54) VEHICLE

(71) Applicant: Yamaha Hatsudoki Kabushiki Kaisha, Shizuoka (JP)

(72) Inventor: Suguru Itoigawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 230 days.

(21) Appl. No.: 16/997,940

(22) Filed: Aug. 20, 2020

(65) Prior Publication Data

US 2021/0062704 A1    Mar. 4, 2021

(30) Foreign Application Priority Data

Aug. 26, 2019   (JP) .............................. JP2019-153740

(51) Int. Cl.
| | | |
|---|---|---|
| *F01N 13/08* | (2010.01) | |
| *F02P 3/01* | (2006.01) | |
| *F16H 57/027* | (2012.01) | |
| *F02F 1/24* | (2006.01) | |
| *B60K 17/06* | (2006.01) | |

(52) U.S. Cl.
CPC .............. *F01N 13/08* (2013.01); *B60K 17/06* (2013.01); *F02F 1/24* (2013.01); *F02P 3/01* (2013.01); *F16H 57/027* (2013.01)

(58) Field of Classification Search
CPC ........ B60K 11/06; B60K 11/08; B60K 17/06; B60K 17/08; B60K 2005/003; B60Y 2200/124; B60Y 2200/20; B60Y 2400/72; F01N 13/08; F01N 13/082; F01N 13/10; F01N 2240/20; F01N 2260/20; F02F 1/24; F02P 13/00; F02P 3/01; F02P 3/02; F16H 57/027; F16H 57/035; F16H 57/0415; F16H 57/0489
See application file for complete search history.

(56) References Cited

U.S. PATENT DOCUMENTS

| | | | | |
|---|---|---|---|---|
| 4,768,477 A | * | 9/1988 | Richardson ............. | H01T 13/16 123/169 PA |
| 8,960,754 B1 | * | 2/2015 | Maeda .................... | B60R 11/06 224/275 |
| 2012/0097119 A1 | * | 4/2012 | Yano ......................... | F01P 1/02 123/41.65 |
| 2016/0332676 A1 | | 11/2016 | Miller et al. | |

\* cited by examiner

*Primary Examiner* — Grant Moubry
*Assistant Examiner* — Ruben Picon-Feliciano
(74) *Attorney, Agent, or Firm* — HEA Law PLLC

(57) ABSTRACT

A vehicle that can cool an ignition coil is provided. The vehicle has an engine having a cylinder head and an ignition coil with a first end exposed from the cylinder head, a CVT that varies and outputs rotary power from the engine, and an exhaust duct having a first exhaust port for exhausting a gas within a CVT case to outside of the CVT case, and a second exhaust port for exhausting a part of the gas flowing to the first exhaust port to outside of the CVT case, wherein the second exhaust port is provided for exhausting the gas within the CVT case to at least a part of the first end of the ignition coil.

10 Claims, 11 Drawing Sheets

VEHICLE

CROSS-REFERENCE TO RELATED APPLICATION

The present application claims priority from Japanese application JP2019-153740 filed on Aug. 26, 2019, the content of which is hereby incorporated by reference, in its entirety, into this application.

BACKGROUND OF THE INVENTION

1. Field of the Invention

This invention relates to a vehicle.

2. Description of the Related Art

US Patent Application Publication 2016/0332676 discloses a vehicle called an all terrain vehicle (ATV) having an engine and a continuously variable transmission that varies and outputs rotary power from the engine. In the vehicle, a V-belt provided within a case of the continuously variable transmission is cooled by a gas taken in from an intake duct and the gas within the case of the continuously variable transmission is exhausted to outside via an exhaust duct.

Here, the engine tends to reach a higher temperature and improvement of cooling performance for the respective components contained in the engine is desired.

SUMMARY OF THE INVENTION

One of the purposes of this disclosure is to provide a vehicle that can cool an ignition coil.

(1) A vehicle proposed in this disclosure includes an engine having a cylinder head and a first ignition coil with a first end exposed from the cylinder head, a continuously variable transmission that varies and outputs rotary power from the engine, and an exhaust duct having a first exhaust port for exhausting a gas within a case of the continuously variable transmission to outside of the continuously variable transmission, and a second exhaust port for exhausting a part of the gas flowing to the first exhaust port to outside of the continuously variable transmission, wherein the second exhaust port is provided for exhausting the gas within the case of the continuously variable transmission to at least a part of the one end of the ignition coil. Accordingly, the first ignition coil may be cooled.

(2) In the vehicle according to (1), at least the part of the first end of the first ignition coil may be placed on an extension of the second exhaust port in a direction orthogonal to an opening surface of the second exhaust port. Accordingly, the first ignition coil may be cooled.

(3) In the vehicle according to (1), the exhaust duct may have a projecting portion projecting outward from an outer circumferential surface thereof and provided at least above the second exhaust port. According to this configuration, entry of water from outside into the exhaust duct may be suppressed.

(4) In the vehicle according to (3), at least a part of the projecting portion may be at the same height as that of at least the part of the first ignition coil. According to this configuration, the first ignition coil may be cooled more efficiently.

(5) In the vehicle according to (3), at least a part of the projecting portion may overlap with the cylinder head in a top view. According to this configuration, the first ignition coil may be cooled more efficiently.

(6) In the vehicle according to (3), the projecting portion may have a tubular shape forming at least a part of an edge of the second exhaust port. According to this configuration, the first ignition coil may be cooled more efficiently.

(7) In the vehicle according to (6), the exhaust duct may have a front portion extending diagonally upward toward a rear side from the case of the continuously variable transmission and a rear portion extending diagonally downward toward the rear side from the front portion and including the first exhaust port and the second exhaust port, and at least a part of a base end of the projecting portion may be provided below a lower end of a boundary between the front portion and the rear portion. According to this configuration, entry of water from outside into the continuously variable transmission may be suppressed.

(8) In the vehicle according to (1), the exhaust duct may have a front portion extending diagonally upward toward a rear side from the case of the continuously variable transmission and a rear portion extending diagonally downward toward the rear side from the front portion and including the first exhaust port and the second exhaust port. According to this configuration, entry of water from outside into the continuously variable transmission may be suppressed.

(9) In the vehicle according to (7), at least a part of the rear portion may be placed to be inclined closer to the cylinder head toward the rear side. According to this configuration, the first ignition coil may be cooled more efficiently.

(10) In the vehicle according to (1), an area of an opening surface of the second exhaust port when the opening surface is seen from a direction orthogonal to the opening surface may be smaller than an area of an opening surface of the first exhaust port. According to this configuration, the flow rate of the gas exhausted from the second exhaust port may be increased and the first ignition coil may be cooled more efficiently.

(11) In the vehicle according to (1), the cylinder head may be placed at a side of the exhaust duct, and the second exhaust port may open toward the side of the exhaust duct.

(12) In the vehicle according to (1), an engine exhaust duct for exhausting a gas within the engine to outside of the engine is further provided, wherein the first exhaust port may be provided for exhausting the gas within the case of the continuously variable transmission to the engine exhaust duct. According to this configuration, the engine exhaust duct may be cooled.

(13) In the vehicle according to (1), the engine having the cylinder head may include a second ignition coil juxtaposed to the first ignition coil, and at least part of the first end of the first ignition coil and part of a first end of the second ignition coil may be placed on an extension of the second exhaust port in a direction orthogonal to an opening surface of the second exhaust port. According to this configuration, at least one of the first ignition coil and the second ignition coil may be cooled.

(14) In the vehicle according to (13), the cylinder head may have a groove extending in a direction in which the first ignition coil and the second ignition coil are juxtaposed, and the first end of the first ignition coil and the first end of the second ignition coil may be exposed in a region in which the groove is provided of the cylinder head. According to the configuration, the first and second ignition coils may be cooled more efficiently.

BRIEF DESCRIPTION OF THE DRAWINGS

The present invention is illustrated by way of example and not limited in the figures of the accompanying drawings in which like references indicate similar elements.

DETAILED DESCRIPTION OF THE INVENTION

As below, an embodiment of the invention (hereinafter, also referred to as "the embodiment") will be explained with reference to the drawings. The embodiment should be understood as an example and the invention is not limited to the embodiment to be described using the drawings. The scope of the invention includes other embodiments having the same or similar advantages as or to those of the embodiment.

In the following explanation and respective drawings, the front side is shown by Y1, the rear side is shown by Y2, the right side is shown by X1, the left side is shown by X2, the top side is shown by Z1, and the bottom side is shown by Z2. Note that these directions are directions as seen from a driver in a vehicle 1.

Figure 1:
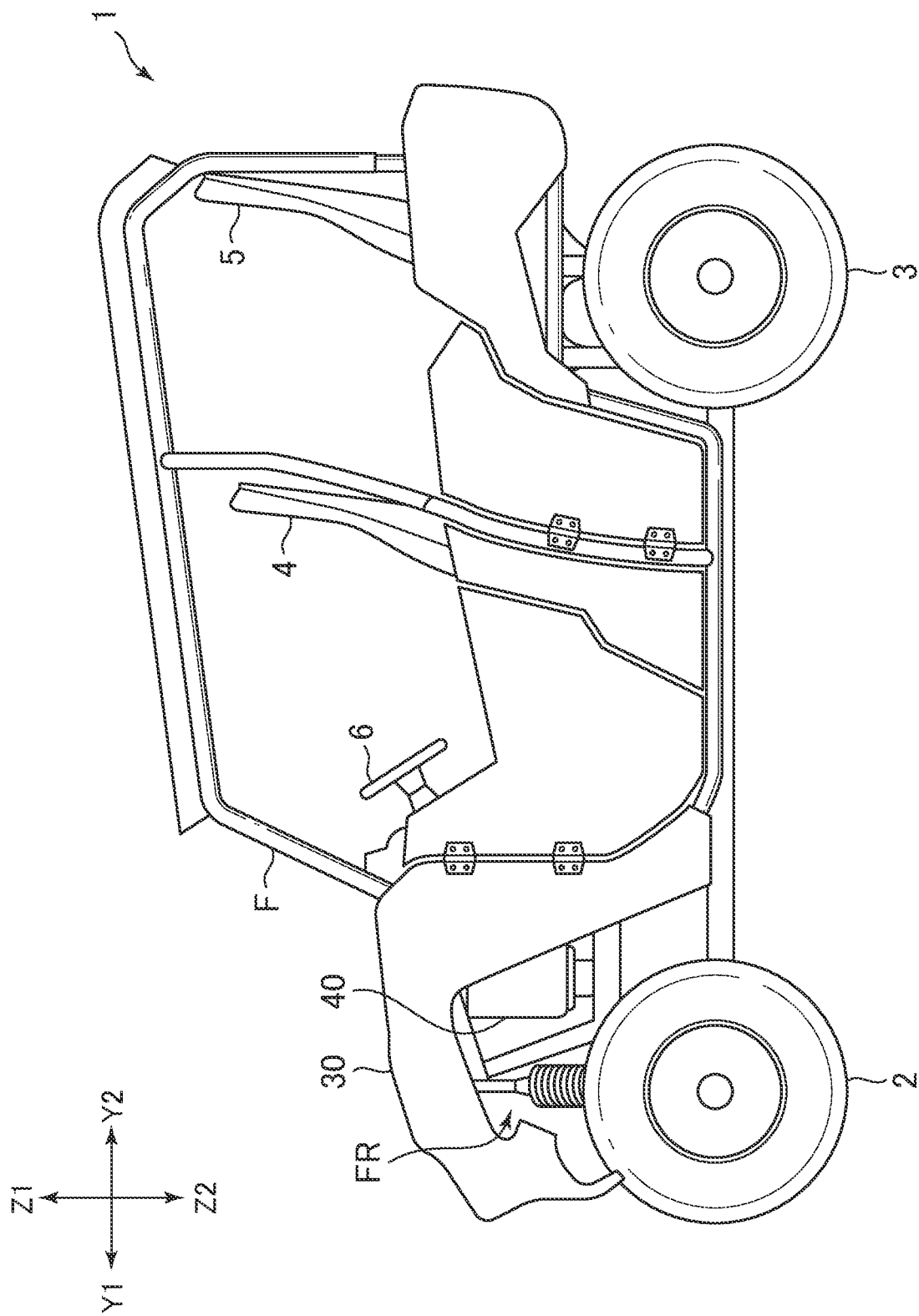
FIG. 1 is a side view of a vehicle seen from the left.
Figure 2:
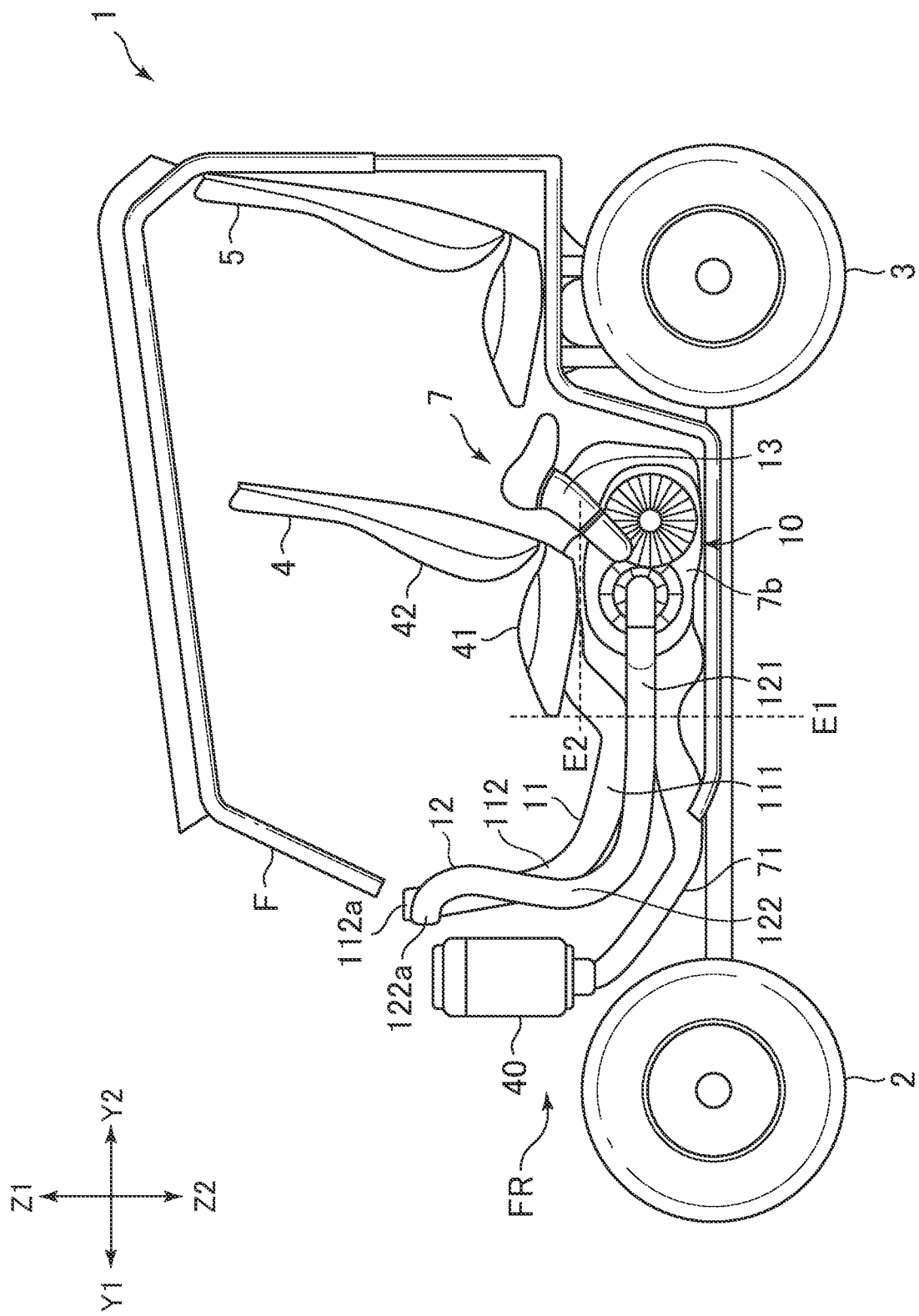
FIG. 2 is a side view of the vehicle seen from the left showing an engine unit (a part of the configuration of the vehicle is omitted).
Figure 3:
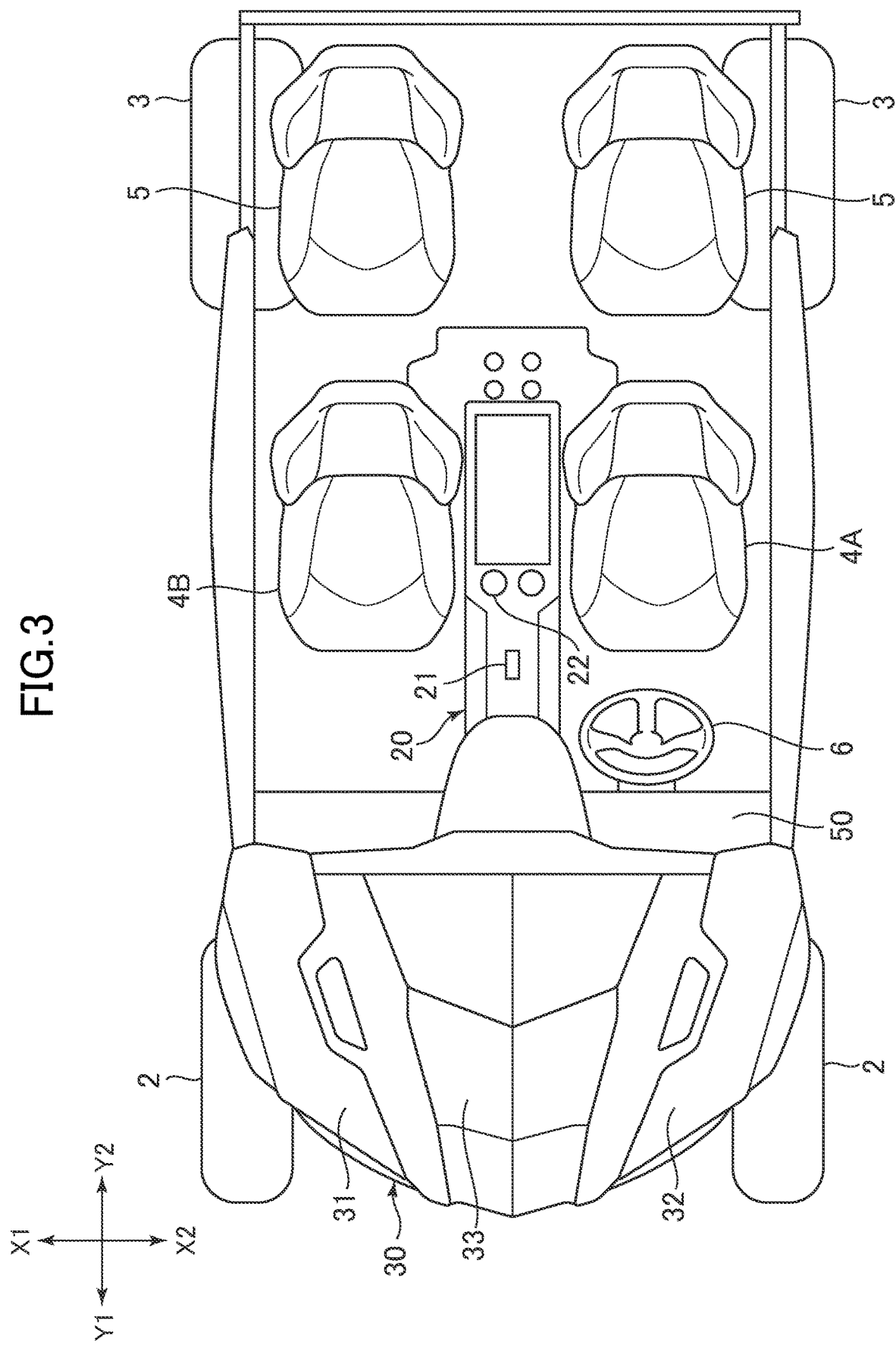
FIG. 3 is a top view of the vehicle seen from above.
Figure 4:
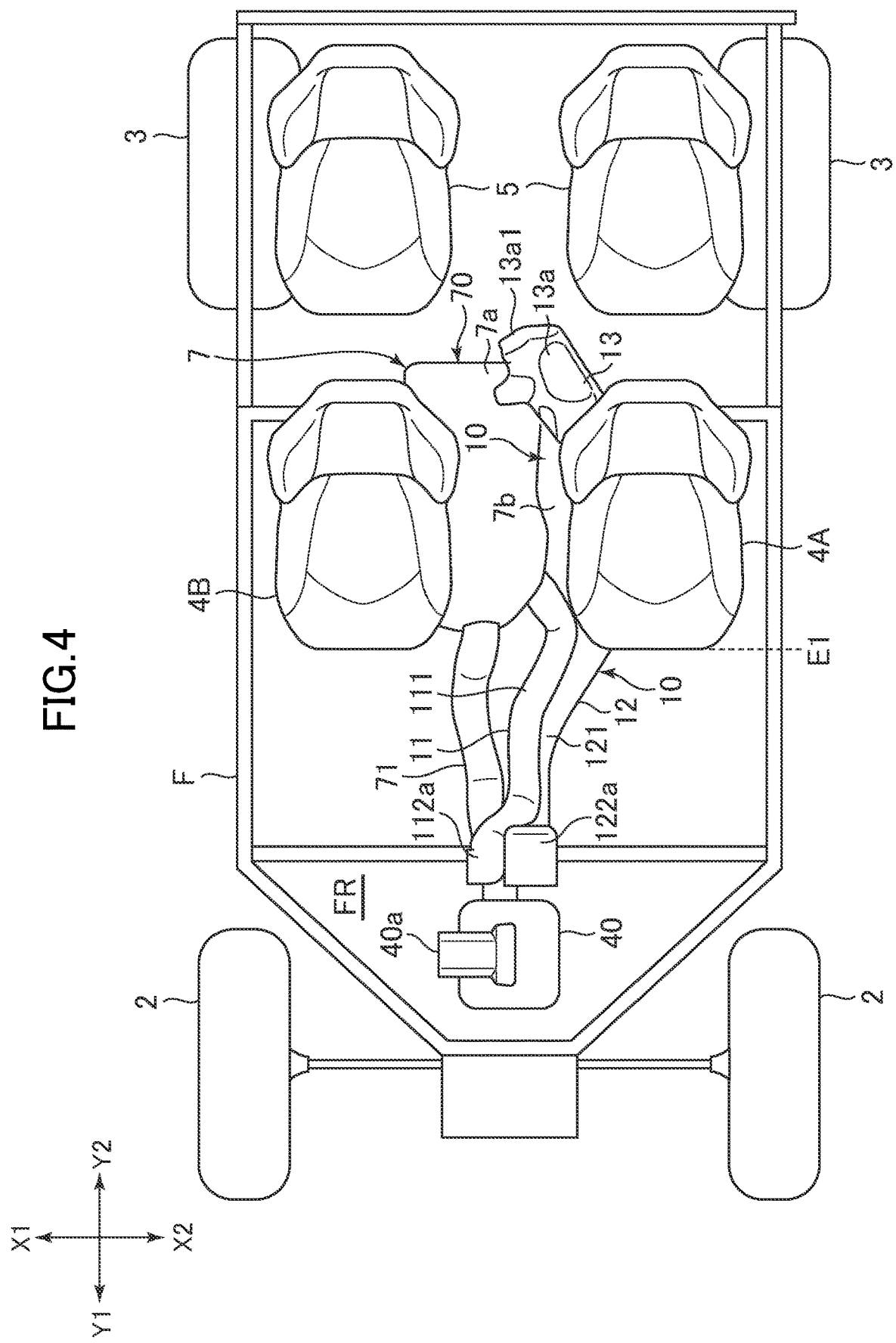
FIG. 4 is a top view of the vehicle seen from above showing the engine unit (a part of the configuration of the vehicle is omitted).

FIG. 1 is a side view of the vehicle from the left. FIG. 2 is a side view of the vehicle from the left showing an engine unit (a part of the configuration of the vehicle is omitted). FIG. 3 is a top view of the vehicle seen from above. FIG. 4 is a top view of the vehicle seen from above showing the engine unit (a part of the configuration of the vehicle is omitted).

Figure 5:
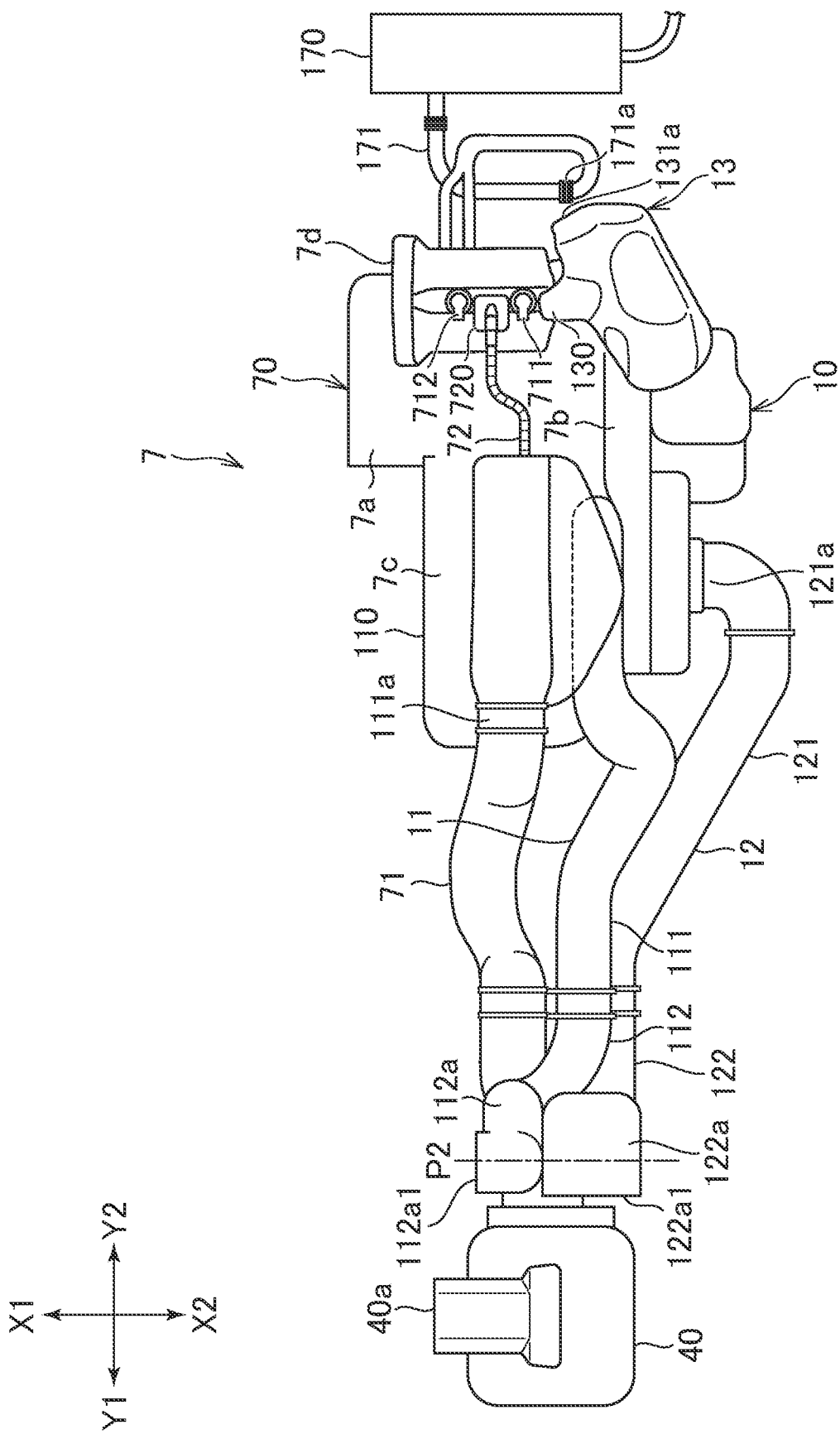
FIG. 5 is a top view of the engine unit seen from above.

FIG. 5 is a top view of the engine unit seen from above. FIG. is a perspective view showing a continuously variable transmission.

[Overall Configuration of Vehicle]

First, referring to FIGS. 1 and 3, the summary of the overall configuration of the vehicle 1 of the embodiment is explained. The vehicle 1 is a vehicle that is frequently used on uneven ground called "all terrain vehicle (ATV)", "Side-by-Side vehicle", "Utility vehicle", or "Recreational Off-Highway vehicle".

The vehicle 1 has front wheels 2 and rear wheels 3. As shown in FIG. 3, the front wheels 2 are respectively placed on the left and the right of the vehicle 1, and the rear wheels 3 are respectively placed on the left and the right of the vehicle 1. Further, the vehicle 1 has front seats 4 and rear seats 5 placed on the rear sides of the front seats 4. As shown in FIG. 3, the front seats 4 are respectively provided on the left side and the right side of the vehicle 1. The front seat 4 provided on the left side is a driver seat 4A on which a driver sits. The front seat 4 provided on the right side is a passenger seat 4B.

A steering wheel 6, an accelerator pedal (not shown), etc. are placed on the front side of the driver seat 4A. Further, as shown in FIG. 3, a select lever (operation lever) 21 and a center console 20 in which cup holders 22 etc. are provided are placed between the driver seat 4A and the passenger seat 4B.

Note that the vehicle 1 does not necessarily have the two front seats 4. That is, the vehicle does not necessarily have the passenger seat 4B placed next to the driver seat 4A. Further, the vehicle 1 does not necessarily have the rear seats 5. That is, the region in which the rear seats 5 are placed shown in FIG. 1 etc. may be used for luggage.

The vehicle 1 has a vehicle body frame F. The vehicle body frame F is formed by connection of a plurality of pipes etc. On the vehicle body frame F, suspensions supporting the front seats 4, the rear seats 5, and the front wheels 2, suspensions supporting the rear wheels 3, and an engine unit 7 and a front cover 30, which will be described later, are mounted.

As shown in FIG. 3, a dashboard 50 is placed on the front side of the front seats 4. On the dashboard 50, various instruments including e.g. a speedometer and a tachometer are mounted. Further, on the dashboard 50, a glove box etc. located on the front side of the passenger seat 4B are provided. In addition, a navigation system etc. may be mounted on the dashboard 50.

As shown in FIG. 3, the vehicle 1 has the front cover 30 forming apart of an exterior of the vehicle on the front side of the dashboard 50. The front cover 30 is located above the front wheels 2 in the side view. Note that, in the embodiment, a region below the front cover 30 and covered by the front cover 30 is referred to as "front region FR". In the front region FR, an air cleaner 40, which will be described later, etc. are placed. The front region FR and a region in which the passenger enters the vehicle are partitioned by the dashboard 50.

As shown in FIG. 3, the front cover 30 includes a plurality of cover members. Specifically, the front cover 30 includes a right cover member 31 forming a part on the right side, a left cover member 32 forming a part on the left side, and the opening/closing cover member 33 forming a part between the right cover member 31 and the left cover member 32. The opening/closing cover member 33 is also called the "hood". The right cover member 31 and the left cover member 32 are fixed to the vehicle body frame F of the vehicle 1. The opening/closing cover member 33 is provided to enable opening and closing of the front region FR. A user may clean and replace the air cleaner 40, etc. in the open state of the opening/closing cover member 33.

[Configuration and Placement of Engine Unit]

Next, details of the configuration and the placement of the engine unit 7 will be explained. The vehicle 1 employs the so-called mid-engined layout in which an engine 70 and a continuously variable transmission 10 are placed near the center of the vehicle body in the front-back direction.

Figure 6:
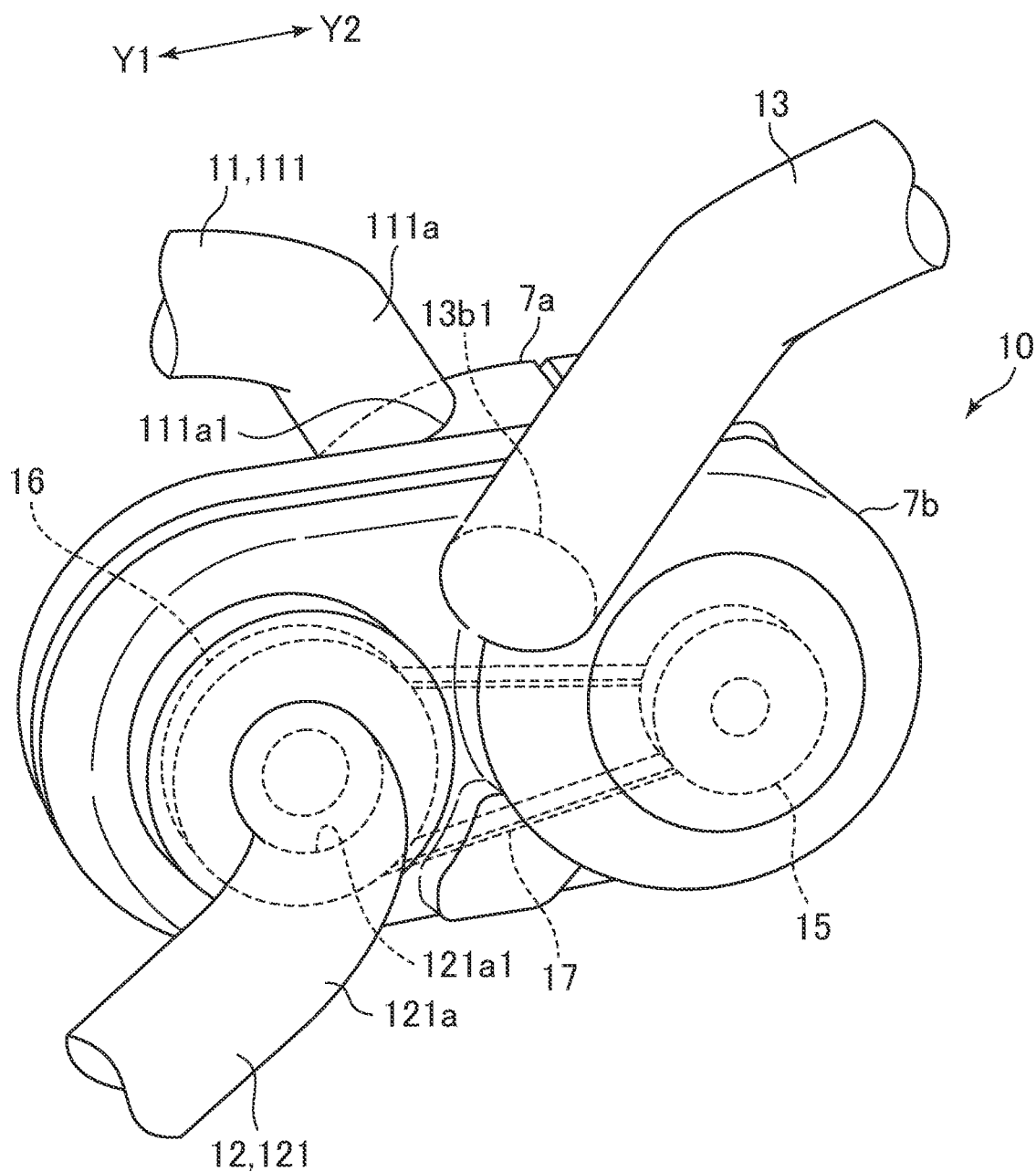
FIG. 6 is a perspective view showing a continuously variable transmission.

As shown in FIG. 5, the engine unit 7 has the engine 70, the continuously variable transmission 10 that varies and outputs rotary power from the engine 70, and a transmission 110 that varies the rotary power output from the continuously variable transmission 10 (hereinafter, the continuously variable transmission is referred to as "CVT"). As shown in FIG. 6, the CVT 10 has a primary pulley 15, a secondary pulley 16, and a V-belt 17 looped over the pulleys. Further, the primary pulley 15 preferably has a fin (not shown) projecting from the side surface. The primary pulley 15 having the fin rotates, and thereby, outside air is introduced into the CVT 10 via an intake duct 11, which will be described later. The secondary pulley 16 also preferably has a fin.

The transmission 110 has a gear (dog clutch) connected to the select lever 21 and movable by the operation of the select lever 21, and can select driving of LOW (forward), HIGH (forward), reverse, etc. by the operation of the select lever 21. The rotary power output by the transmission 110 is transmitted to the rear wheels 3 and the front wheels 2 via a propeller shaft (not shown) extending in the front-back direction. The engine 70 has a crank case 7a placed in the lower part thereof, and a cylinder unit placed on the top side of the crank case 7a. The cylinder unit has a cylinder (not shown) and a cylinder head 7d.

A transmission case 7c housing the transmission 110 is placed on the front side of the crank case 7a. A CVT case 7b housing the CVT 10 is placed on the left side of the crank case 7a and the transmission case 7c. Further, the engine unit 7 has intake ducts 11 and 12 and an exhaust duct 13 for cooling the V-belt 17 of the CVT 10. These ducts 11, 12 and 13 will be described later in detail.

As shown in FIGS. 2 and 4, the engine 70 and the CVT 10 are at least partially located on the back side of the front-end (E1 in FIG. 2) of the front seats 4 and on the bottom side of the lower end (E2 in FIG. 2) of the front seats 4. In this example, the crank case 7a, the CVT case 7b, and the transmission case 7c are located on the bottom side of the lower end (E2 in FIG. 2) of the front seats 4. Note that the cylinder head 7d (cylinder and cylinder head) may be partially above a lower end of a seat bottom 41. Further, in this example, the crank case 7a, the CVT case 7b, and the transmission case 7c are located on the rear side of the front-end (E1 in FIG. 2) of the seat bottom 41.

Note that the front seat 4 includes the seat bottom 41 containing a seat surface on which the passenger sits and a seat back 42 placed on the rear side of the seat bottom and supporting the back of the passenger sitting on the seat bottom 41. Here, the front-end of the front seat 4 is the front-end of the seat bottom 41, and the lower end of the front seat 4 is the lower end of the seat bottom 41. The broken lines E1 shown in FIGS. 2 and 4 show the front-end of the front seat 4, and the broken line E2 shown in FIG. 2 shows the lower end of the front seat 4.

Further, as shown in FIG. 4, the engine unit 7 is at least partially located between the driver seat 4A and the passenger seat 4B in the top view. In the embodiment, the crank case 7a, the CVT case 7b, and the transmission case 7c are partially located between the driver seat 4A and the passenger seat 4B in the top view of the vehicle body.

Further, a part of the engine unit 7 is provided immediately below the center console 20. In the embodiment, as shown in FIGS. 3 and 4, parts of the crank case 7a of the engine 70 and the CVT case 7b of the CVT 10 are provided immediately below the center console 20. Note that, in FIG. 4, illustration of the center console 20 is omitted and the engine unit 7 is seen, however, actually, as shown in FIG. 3, the engine unit 7 is not seen from the passenger due to the center console 20.

An intake duct 71 is connected to the cylinder head 7d of the engine 70. As shown in FIGS. 2, 5, etc., the front-end portion of the intake duct 71 is connected to the air cleaner 40 and the rear-end portion is connected to a secondary air introduction device 720 exposed in the upper surface of the cylinder head 7d of the engine 70 via a tube 72.

The air cleaner 40 has a box shape and has an intake port 40a for taking in the outside air in the upper part thereof. The air cleaner 40 has a filter that cleans the outside air inside.

The air cleaner 40 sends the outside air taken in from the intake port 40a through the intake duct 71 to the engine 70. The intake port 40a opens toward the right side. That is, the intake port 40a opens in a direction orthogonal to the direction in which the vehicle travels. Accordingly, when the vehicle 1 is moving, the possibility of taking in dust, etc. from the intake port 40a may be reduced.

The air cleaner 40 is placed in the front region FR. As shown in FIGS. 2 and 4, the intake duct 71 is at least partially placed on the bottom side of the lower end (E2 in FIG. 2) of the front seats 4, and extends from the rear side toward the front side. Further, as shown in FIGS. 3 and 4, a part of the intake duct 71 is provided to extend immediately below the center console 20.

As shown in FIGS. 2 and 5, the intake duct 11 includes a first tube part 111 extending in the front-back direction and a second tube part 112 connected to the front portion of the first tube part 111 and extending in the vertical direction. A part of the first tube part 111 of the intake duct 11 is provided to extend immediately below the center console 20. Note that the first tube part 111 and the second tube part 112 may be separately formed or integrally formed. That is, the two tube parts 111 and 112 may be connected to each other by connecting means, or a part of one tube may function as the tube part 111 and the other part may function as the tube part 112.

As shown in FIG. 6, a connection port 111a1 connected to the crank case 7a is provided in a rear-end portion 111a of the first tube part 111. The interior of the intake duct 11 communicates with the interior of the CVT case 7b via the connection port 111a1 and the crank case 7a. As shown in FIG. 5, an intake port 112a1 for taking in the outside air is provided in a front-end portion 112a of the second tube part 112. The intake duct 11 sends the outside air taken in from the intake port 112a1 through the second tube part 112, the first tube part 111, the connection port 111a1, and the crank case 7a to the CVT 10.

As shown in FIGS. 2 and 5, an intake duct 12 includes a first tube part 121 extending in the front-back direction and a second tube part 122 connected to the front portion of the first tube part 121 and extending in the vertical direction. A part of the first tube part 121 of the intake duct 12 is provided to extend immediately below the center console 20. Note that the first tube part 121 and the second tube part 122 may be separately formed or integrally formed. That is, the two tube parts 121 and 122 may be connected to each other by connecting means, or apart of one tube may function as the tube part 121 and the other part may function as the tube part 122.

As shown in FIG. 6, a connection port 121a1 connected to the CVT case 7b is provided in a rear-end portion 121a of the first tube part 121. The connection port 121a1 is open to face the secondary pulley 16 on the front side and the left side of the CVT case 7b. As shown in FIG. 5 etc., an intake port 122a1 for taking in the outside air is provided in a front-end portion 122a of the second tube part 122. The intake duct 12 sends the outside air taken in from the intake port 122a1 through the second tube part 122, the first tube part 121, and the connection port 121a1 to the CVT 10.

As shown in FIG. 5, the intake duct 12 is preferably placed so that the first tube part 121 may at least partially overlap with the first tube part 111 of the intake duct 11 in the top view. Specifically, as shown in FIG. 5, the first tube part 111 and the first tube part 121 bend not to overlap each other in the rear parts so that the overlapping portions may increase toward the front parts. According to the configuration, the rear parts of the intake ducts 11 and 12 (i.e., the first tube parts 111 and 121) may be easily placed in a space having a smaller width in the left-right direction formed immediately below the center console 20.

Here, the reason that the two intake ducts connected to the CVT case 7b are provided is explained. In the embodiment, as described above, the configuration in which the intake duct 11 and the intake duct 12 are respectively connected to the CVT case 7b is employed. As described above, the two intake ducts are provided, and thereby, the CVT 10 may be cooled more effectively. Particularly, when the rubber V-belt 17 is used, improvement of cooling performance is large.

Further, in the embodiment, the configuration in which the outside air is taken in from the two intake ports 112a1 and 122a1 and the outside air taken in from those two intake ports 112a1 and 122a1 is sent to the CVT 10 via the respective different connection ports, is employed. Here, a configuration in which the outside air is taken in from one intake port, bifurcation is formed, and thereby, the outside air taken in from one intake port is respectively sent to the CVT via the different connection ports. However, in the configuration, when the state changes from a state (low-velocity state) in which the outside air is introduced into the CVT 10 by rotation of the primary pulley 15 to a state (high-velocity state) in which the outside air is introduced into the CVT 10 by rotation of the secondary pulley 16, that is, when the velocity of the vehicle 1 increases, the air may circulate within the ducts and the warm air may accumulate within the intake ducts.

In the configuration of the embodiment, the intake port 112a1 of the intake duct 11 and the intake port 122a1 of the intake duct 12 are respectively independently provided, and the connection port 111a1 of the intake duct 11 and the connection port 121a1 of the intake duct 12 are respectively independently provided. That is, the two independent flow channels are provided. Accordingly, circulation and accumulation of the warm air within the intake ducts are suppressed. As a result, the cooling performance of the CVT 10 is improved.

Figure 7:
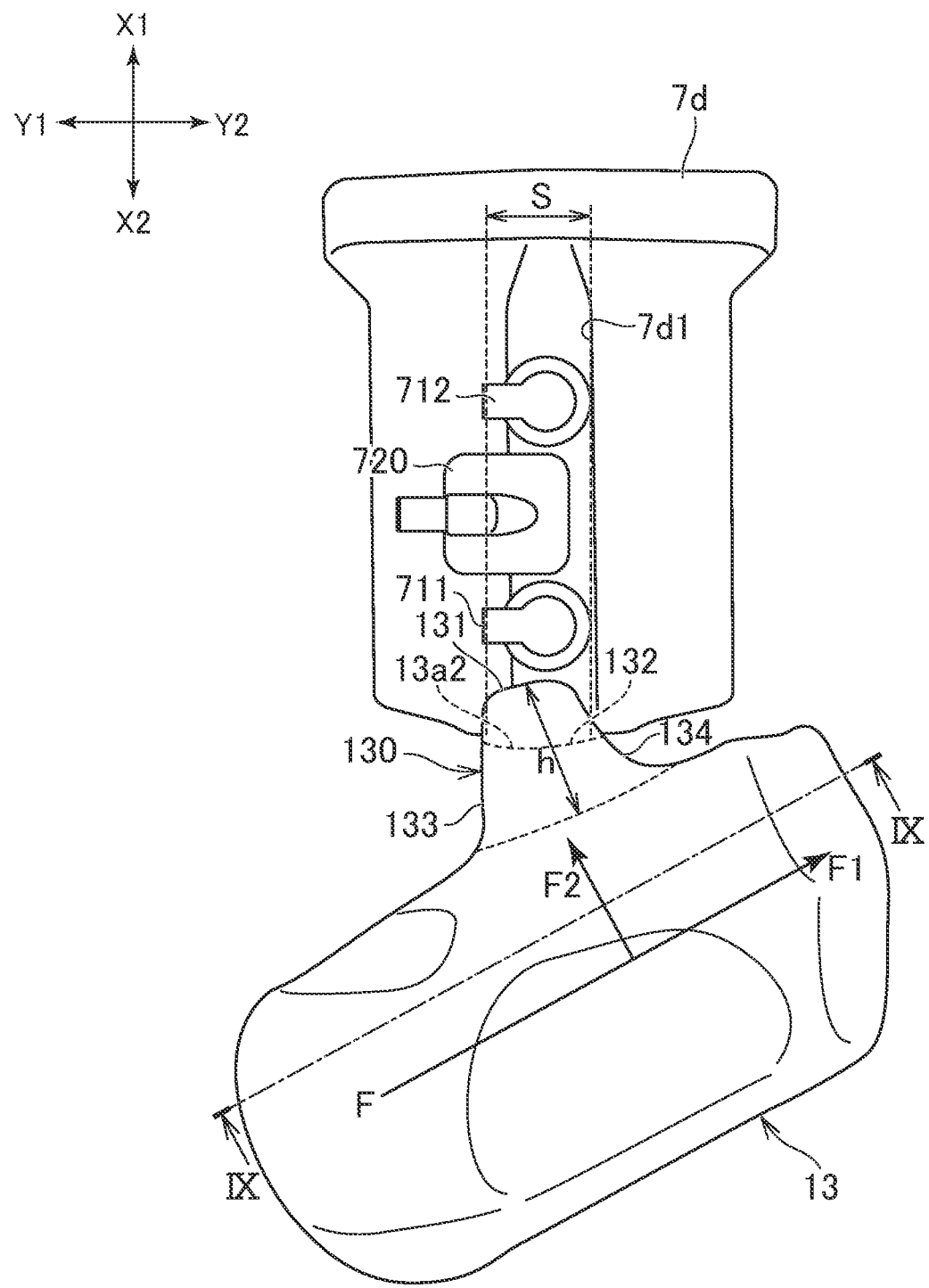
FIG. 7 is a top view of an exhaust duct and a cylinder head seen from above.
Figure 8:
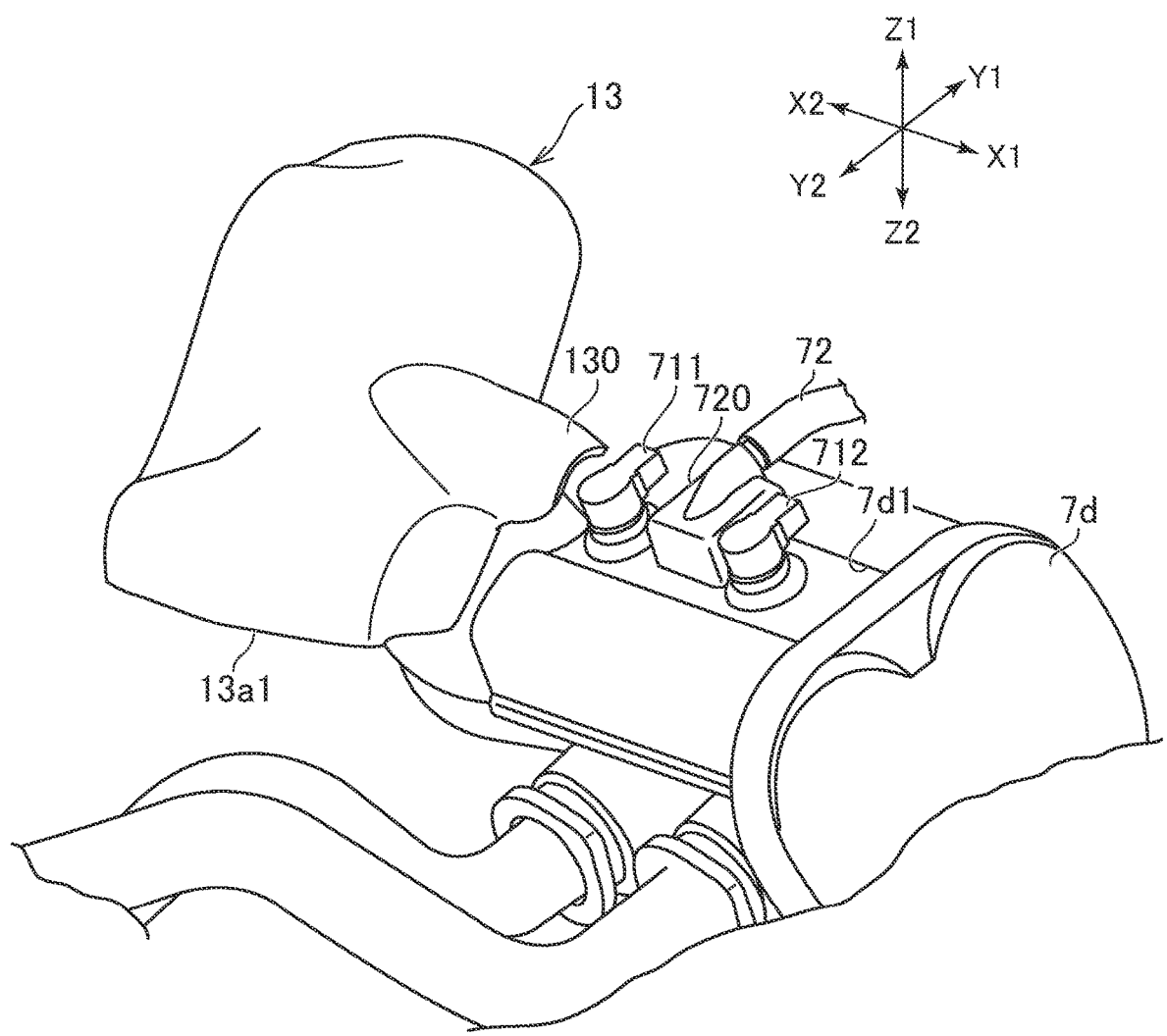
FIG. 8 is a perspective view showing the exhaust duct and the cylinder head seen from a diagonally right rear side.
Figure 9:
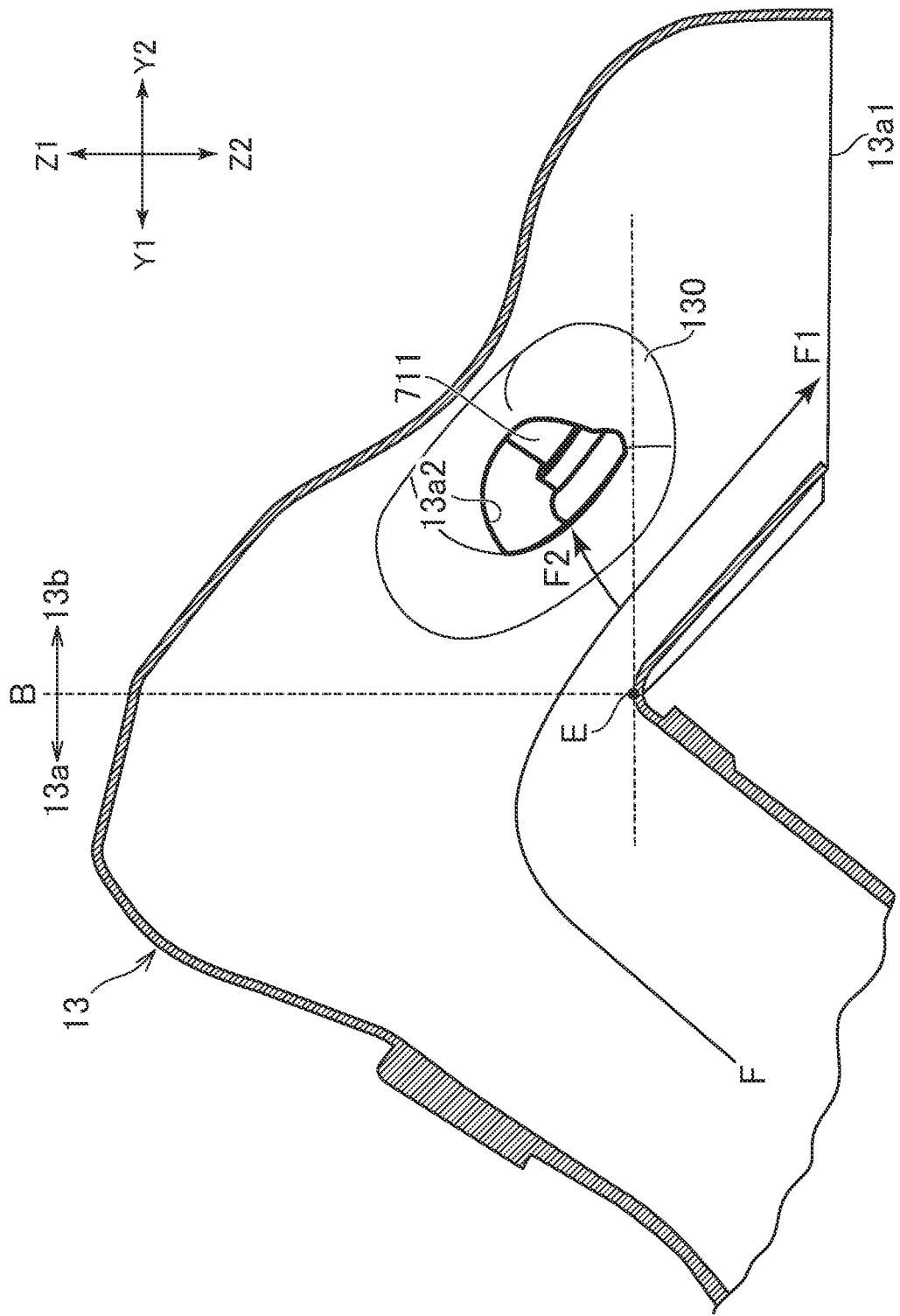
FIG. 9 is a sectional view showing a section cut along a cut line shown in FIG. 7.
Figure 10:
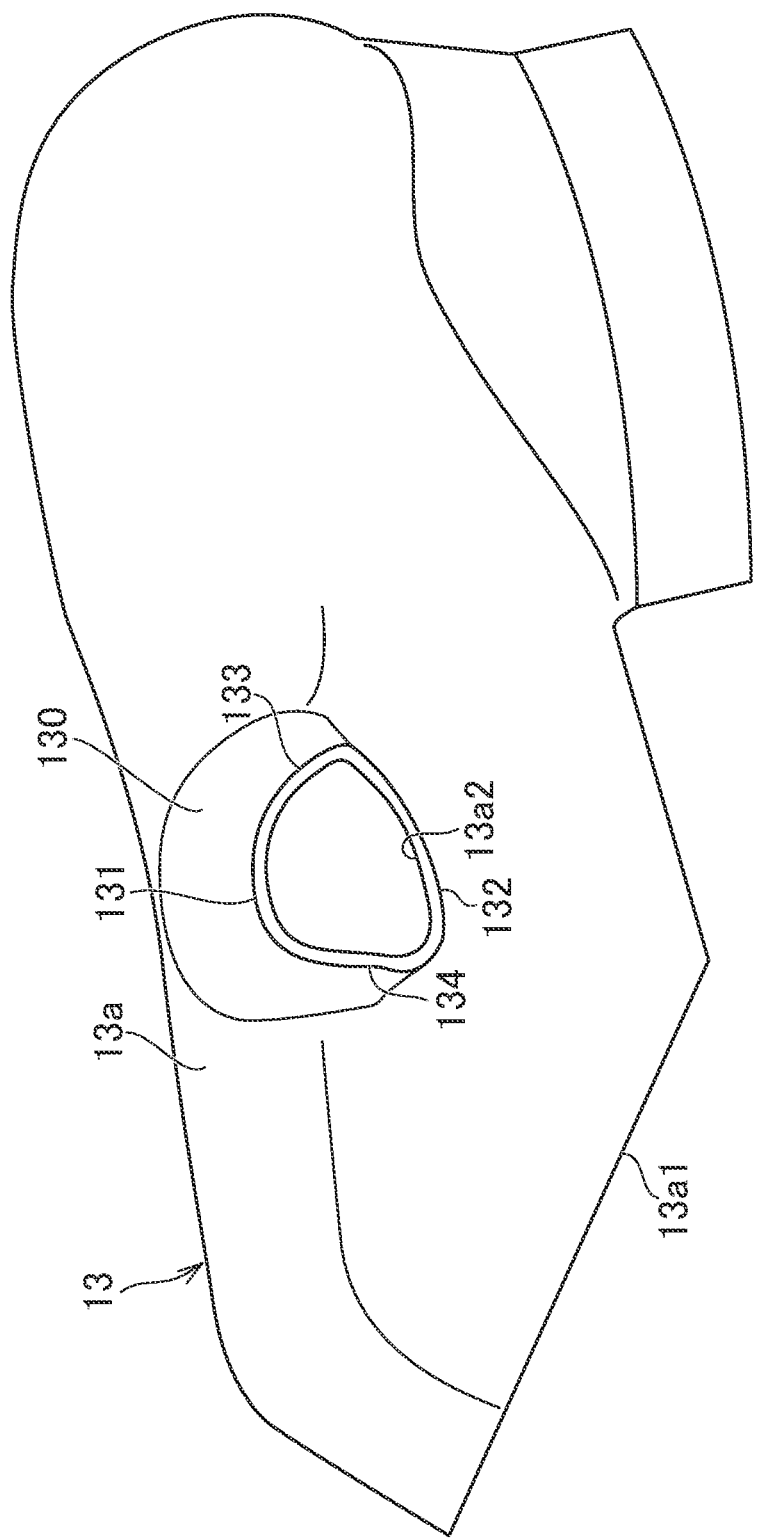
FIG. 10 shows the exhaust duct seen from a direction orthogonal to an opening surface of a second exhaust port.
Figure 11:
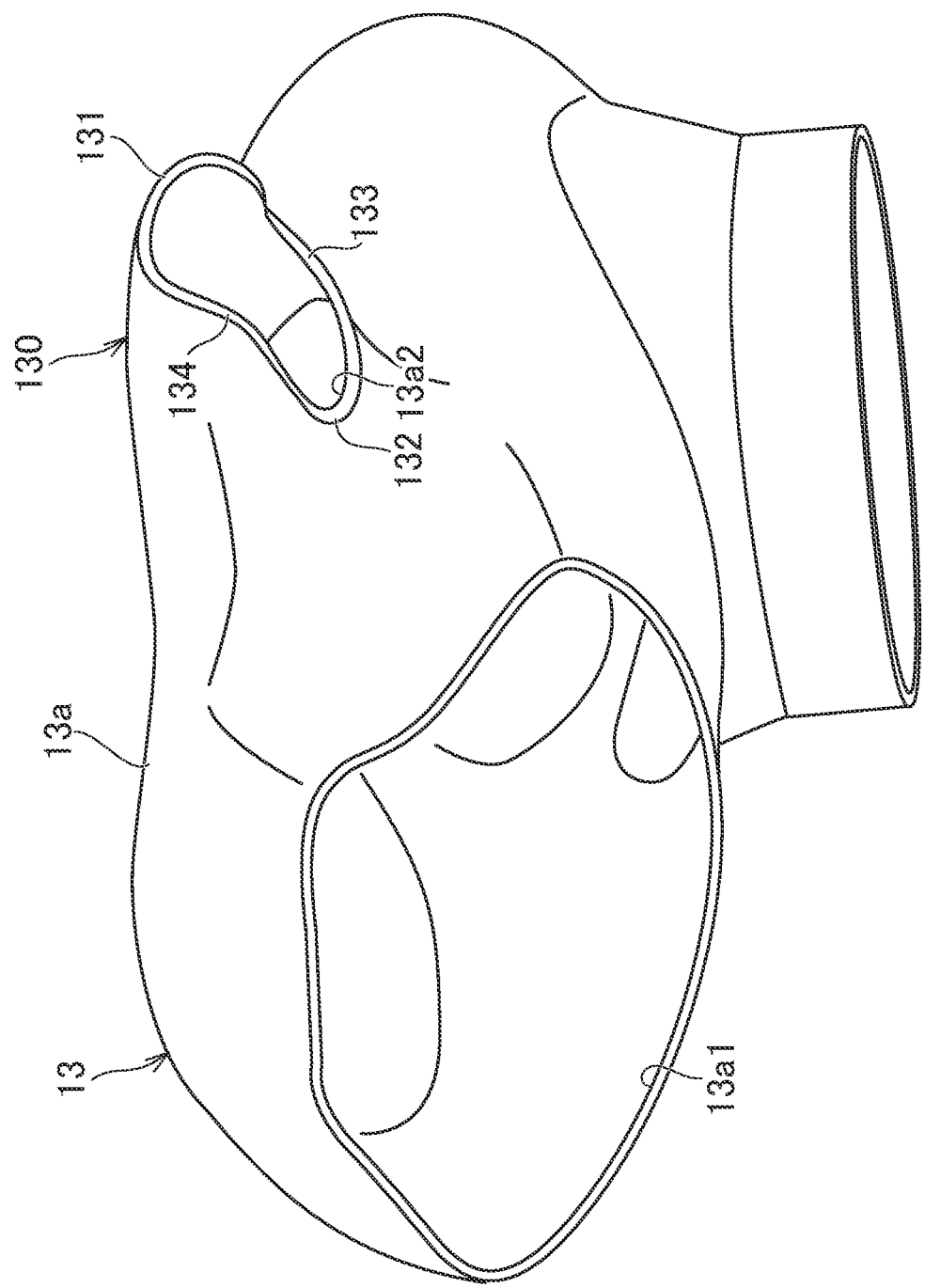
FIG. 11 shows a first exhaust port and the second exhaust port of the exhaust duct.

Next, mainly referring to FIGS. 5 to 11, the exhaust duct 13 of the embodiment will be explained. FIG. 7 is a top view of the exhaust duct and the cylinder head seen from above. FIG. 8 is a perspective view showing the exhaust duct and the cylinder head seen from a diagonally right rear side. FIG. 9 is a sectional view showing the section cut along the cut line shown in FIG. 7. FIG. 10 shows the exhaust duct seen from the direction orthogonal to the opening surface of the second exhaust port. FIG. 11 shows the first exhaust port and the second exhaust port of the exhaust duct.

The vehicle 1 has the exhaust duct 13 connected to the CVT case 7b. The exhaust duct 13 exhausts the gas within the CVT case 7b to outside of the CVT case. As shown in FIG. 6, the exhaust duct 13 has a connection port 13b1 connected to the CVT case 7b.

As shown in FIG. 5, the exhaust duct 13 is placed on the left of the cylinder head 7d. Further, the exhaust duct 13 is positioned to be inclined to the right side toward the rear side in the top view. That is, the exhaust duct 13 is positioned to be inclined closer to the cylinder head 7d toward the rear side.

Further, the exhaust duct 13 has a front portion 13a extending diagonally upward toward the rear side from the CVT case 7b and a rear portion 13b extending diagonally downward toward the rear side from the front portion 13a. In FIG. 9, the left side of a boundary B is the front portion 13a and the right side of the boundary B is the rear portion 13b.

As shown in FIG. 11 etc., the exhaust duct 13 has a first exhaust port 13a1 and a second exhaust port 13a2. As shown in FIG. 9, both the first exhaust port 13a1 and the second exhaust port 13a2 are provided in the rear portion 13b of the exhaust duct 13. Further, as shown in FIG. 9, the first exhaust port 13a1 opens toward the bottom side. As shown in FIG. 7 etc., the second exhaust port 13a2 opens toward the side.

The first exhaust port 13a1 exhausts the gas within the CVT case 7b to the rear side of the vehicle 1. Specifically, the first exhaust port 13a1 is provided for exhausting the gas within the CVT case 7b to an engine exhaust duct 171 for exhausting the gas within the engine 70 (see FIG. 5). The engine exhaust duct 171 connects the engine 70 and a muffler 170. According to the configuration, the engine exhaust duct 171 may be cooled. The engine exhaust duct 171 is formed by connection of a plurality of tubes and particularly, a connecting portion 171a (see FIG. 5) of the tubes tends to reach a higher temperature. Accordingly, the first exhaust port 13a1 preferably opens for exhausting the gas within the CVT case 7b to the connecting portion 171a of the engine exhaust duct 171 formed by the plurality of tubes.

The second exhaust port 13a2 is a branch port for exhausting a part of the gas flowing from within the CVT case 7b to the first exhaust port 13a1 to outside.

FIGS. 7 and 9 show a flow path F of the gas flowing within the exhaust duct 13. As shown in FIGS. 7 and 9, the gas flowing within the exhaust duct 13 passes through a flow path F1 and is exhausted to outside through the first exhaust port 13a1. Further, a part of the gas flowing within the exhaust duct 13 passes through a flow path F2 branching with respect to the flow path F1 and is exhausted to outside through the second exhaust port 13a2.

The engine 70 has ignition coils 711 and 712 with one ends exposed to the top side from the cylinder head 7d. Note that the other ends of the ignition coils 711 and 712 are connected to a spark plug (not shown) of the engine 70. A part of the spark plug is exposed in a combustion chamber within the engine 70. The ignition coils 711 and 712 are devices that generate high voltages necessary for combustion of gasoline in the combustion chamber of the engine 70.

FIG. 8 etc. show portions of the ignition coils 711 and 712 exposed from the cylinder head 7d. In the embodiment, as shown in FIG. 7 etc., the ignition coil 711 and the ignition coil 712 are placed apart in the left-right direction via the secondary air introduction device 720.

Here, the engine 70 tends to reach a higher temperature. Accordingly, the cooling performance is secured by formation of a fin or the like in the metallic block including the cylinder head 7d. It is preferable to employ means for securing cooling performance also for the ignition coils 711 and 712 separated from the cylinder head 7d.

Accordingly, in the embodiment, the second exhaust port 13a2 is provided for exhausting the gas within the CVT case 7b to the portions of the ignition coils 711 and 712 exposed from the cylinder head 7d. Specifically, parts of the portions of the ignition coils 711 and 712 exposed from the cylinder head 7d are placed on the extension of the second exhaust port 13a2 in a direction orthogonal to the opening surface of the second exhaust port 13a2. S, shown in FIG. 7, is a range indicating the extension of the second exhaust port 13a2 in the direction orthogonal to the opening surface of the second exhaust port 13a2.

Note that, in the embodiment, the opening surface of the second exhaust port 13a2 is defined as a surface parallel to the vertical direction and passing through an end surface of a lower portion 132, which will be described later.

FIG. 9 shows the part of the portion of the ignition coil 711 exposed from the cylinder head 7*d* is present on the extension of the second exhaust port 13*a*2 in the direction orthogonal to the opening surface of the second exhaust port 13*a*2.

Further, in the embodiment, a configuration in which the exhaust duct 13 has a tubular part 130 projecting outward from the outer circumferential surface is employed. As shown in FIGS. 7 and 11, the tubular part 130 includes an upper portion 131, a lower portion 132, a front portion 133 connecting the upper portion 131 and the lower portion 132, and a rear portion 134 connecting the upper portion 131 and the lower portion 132.

The upper portion 131 is a portion including the upper end of the tubular part 130 in the maximum amount of projection of the tubular part 130. Here, the amount of projection of the upper portion 131 refers to a length from the base end of the tubular part 130 to the end surface of the upper portion 131 in the projection direction. A length h shown in FIG. 7 shows the amount of projection of the upper portion 131. As shown in FIG. 7, the upper portion 131 preferably at least partially overlaps with the cylinder head 7*d* in the top view.

The lower portion 132 is a portion including the lower end of the tubular part 130 in the minimum amount of projection of the tubular part 130. Here, the amount of projection of the lower portion 132 refers to a length from the base end of the tubular part 130 to the end surface of the lower portion 132 in the projection direction.

The front portion 133 is a portion including the front-end of the tubular part 130. The rear portion 134 is a portion including the rear-end of the tubular part 130. Further, in the embodiment, the amount of projection of the front portion 133 is larger than the amount of projection of the rear portion 134. Here, the amount of projection of the front portion 133 refers to a length from the base end of the tubular part 130 to the end surface of the front portion 133 in the projection direction. Further, the amount of projection of the rear portion 134 refers to a length from the base end of the tubular part 130 to the end surface of the rear portion 134 in the projection direction.

The above described configuration is employed, and thereby, the part of the gas within the CVT case 7*b* is exhausted to outside of the CVT case 7*b* through the second exhaust port 13*a*2 and flows in the range S shown in FIG. 7. Accordingly, the ignition coils 711 and 712 are cooled by the gas exhausted to outside of the CVT case 7*b* through the second exhaust port 13*a*2.

In the embodiment, the configuration in which the ignition coils 711 and 712 are cooled by the gas exhausted from the exhaust duct 13 is employed, and thereby, it is not necessary to separately provide a device or structure for cooling the ignition coils 711 and 712. That is, the ignition coils 711 and 712 may be cooled by the simple configuration without an increase in number of components.

As shown in FIGS. 7 and 8, a groove 7*d*1 extending in the left-right direction may be provided in the upper surface of the cylinder head 7*d*. Further, the ignition coils 711 and 712 may be partially exposed from a region in which the groove 7*d*1 is provided of the upper surface of the cylinder head 7*d*. The gas exhausted through the second exhaust port 13*a*2 is guided by the walls forming the groove 7*d*1 and flows along the groove 7*d*1. Accordingly, the gas reaches not only the ignition coil 711 placed in the position closer to the exhaust duct 13 but also the ignition coil 712 placed in the position farther from the exhaust duct 13 at the maintained flow rate. Thereby, the ignition coil 712 may be efficiently cooled.

The tubular part 130 extends with the diameter smaller toward an outside of the CVT case 7*b*. Accordingly, the flow rate of the gas exhausted from the second exhaust port 13*a*2 to outside of the CVT case 7*b* is higher toward the direction in which the tubular part 130 projects. Thereby, the ignition coils 711 and 712 may be efficiently cooled.

The area of the opening surface when the opening surface of the second exhaust port 13*a*2 is seen from the direction orthogonal to the opening surface is preferably smaller than the area of the opening surface of the first exhaust port 13*a*1. Specifically, the area of the opening surface when the opening surface of the second exhaust port 13*a*2 is seen from the direction orthogonal to the opening surface is preferably equal or smaller than one-fifth the area of the opening surface of the first exhaust port 13*a*1.

As described above, the upper portion 131 at least partially overlaps with the cylinder head 7*d* in the top view. Accordingly, the gas exhausted from the second exhaust port 13*a*2 is harder to flow upward before reaching the ignition coil 711 and the ignition coil 711 may be cooled more reliably.

Note that, in the embodiment, the amount of projection of the front portion 133 is set to be larger than the amount of projection of the rear portion 134, however, not limited to that. The amounts of projection of the front portion 133 and the rear portion 134 may be set to be appropriate amounts according to the position of the exhaust duct 13 relative to the ignition coils 711 and 712. That is, the amount of projection of the rear portion 134 may be set to be larger than the amount of projection of the front portion 133 depending on the position of the exhaust duct 13 relative to the ignition coils 711 and 712.

Here, measures for suppressing water flowing from outside of the CVT case 7*b*, including rainwater or water from a car wash that gets into the CVT case 7*b* via the exhaust duct 13, are necessary. Particularly, measures for suppressing water flowing from outside of the CVT case 7*b* through the second exhaust port 13*a*2 opening toward the side are necessary.

As described above, in the embodiment, the exhaust duct 13 has the tubular part 130 including the upper portion 131. Accordingly, even when rainwater or the like falls from above, the upper portion 131 serves as a roof and entry of water from outside into the exhaust duct 13 through the second exhaust port 13*a*2 is suppressed. As a result, entry of water from outside of the CVT case 7*b* to inside of the CVT case 7*b* is suppressed.

As shown in FIG. 9, the second exhaust port 13*a*2 is provided in the rear portion 13*b* of the exhaust duct 13. Further, as shown in FIG. 9, at least a part of the base end of the tubular part 130 is formed below a lower end E of the boundary B. Accordingly, if water enters the exhaust duct 13 from outside of the CVT case 7*b* through the second exhaust port 13*a*2, the entering water does not flow toward the front portion 13*a* side of the boundary B. That is, even when water enters the exhaust duct 13 from outside of the CVT case 7*b* through the second exhaust port 13*a*2, the water does not flow toward the CVT case 7*b* side, but is exhausted to outside of the CVT case 7*b* through the first exhaust port 13*a*1.

Note that the exhaust duct 13 is not limited to that having the tubular part 130, but may be one having at least the first exhaust port 13*a*1 and the second exhaust port 13*a*2.

Alternatively, the exhaust duct 13 may have only the upper portion 131 of the tubular part 130 as the projecting portion. That is, the projecting portion may be provided only in the upper part of the exhaust duct 13. At least the upper portion 131 is provided, and thereby, entry of water from outside into the exhaust duct 13 through the second exhaust port 13a2 may be suppressed.

SUMMARY (1) As described above, the vehicle 1 proposed in this disclosure includes the engine 70 having the cylinder head 7d and the first ignition coil 711 with a first end exposed from the cylinder head 7d, the CVT 10 that varies and outputs rotary power from the engine 70, and the exhaust duct 13 having the first exhaust port 13a1 for exhausting the gas within the CVT case 7b to outside of the CVT case 7b, and the second exhaust port 13a2 for exhausting a part of the gas flowing to the first exhaust port 13a1 to outside of the CVT case 7b, wherein the second exhaust port 13a2 is provided for exhausting the gas within the CVT case 7b to at least a part of the first end of the first ignition coil 711.

(2) At least the part of the first end of the first ignition coil 711 may be placed on the extension of the second exhaust port 13a2 in the direction orthogonal to the opening surface of the second exhaust port 13a2.

(3) The exhaust duct 13 may have the upper portion 131 projecting outward from the outer circumferential surface thereof and provided above the second exhaust port 13a2.

(4) At least a part of the upper portion 131 may be at the same height as that of at least the part of the first ignition coil 711.

(5) At least a part of the upper portion 131 may overlap with the cylinder head 7d in the top view.

(6) The tubular part 130 may form at least a part of the edge of the second exhaust port 13a2.

(7) The exhaust duct 13 may have the front portion 13a extending diagonally upward toward the rear side from the CVT case 7b and the rear portion 13b extending diagonally downward toward the rear side from the front portion 13a and including the first exhaust port 13a1 and the second exhaust port 13a2, and at least a part of the base end of the tubular part 130 may be provided below the lower end of the boundary B between the front portion 13a and the rear portion 13b.

(8) The exhaust duct 13 may have the front portion 13a extending diagonally upward toward the rear side from the CVT case 7b and the rear portion 13b extending diagonally downward toward the rear side from the front portion 13a and including the first exhaust port 13a1 and the second exhaust port 13a2.

(9) At least a part of the rear portion 13b may be placed to be inclined closer to the cylinder head 7d toward the rear side.

(10) The area of the opening surface of the second exhaust port 13a2 when the opening surface is seen from the direction orthogonal to the opening surface may be smaller than the area of the opening surface of the first exhaust port 13a1.

(11) The cylinder head 7d may be placed at the side of the exhaust duct 13, and the second exhaust port 13a2 may open toward the side of the exhaust duct 13.

(12) The engine exhaust duct 171 for exhausting the gas within the engine 70 to outside of a CVT case 7b is further provided, wherein the first exhaust port 13a1 may be provided for exhausting the gas within the CVT case 7b to the engine exhaust duct 171.

(13) The engine having the cylinder head can further include a second ignition coil 712 juxtaposed to the first ignition coil 711, and at least a part of the first end of the first ignition coil 711 and at least part of a first end of the second ignition coil 712 may be placed on the extension of the second exhaust port 13a2 in the direction orthogonal to the opening surface of the second exhaust port 13a2.

(14) The cylinder head 7d may have the groove 7d1 in the direction in which the first ignition coil 711 and the second ignition coil 712 are juxtaposed, and the first end of the first ignition coil 711 and the first end of the second ignition coil 712 may be exposed in the region in which the cylinder heard groove 7d1 is provided.

What is claimed is:

1. A vehicle comprising:
    an engine having a cylinder head and a first ignition coil with a first end exposed from the cylinder head;
    a continuously variable transmission (CVT) that varies and outputs rotary power from the engine;
    a case surrounding the CVT, and
    an exhaust duct connected to the case, having a first exhaust port configured to exhaust a gas within the case to outside of the case, and a second exhaust port configured to exhaust a part of the gas flowing to the first exhaust port to outside of the case,
    wherein the second exhaust port is further configured to exhaust the gas within the case to at least a part of the first end of the first ignition coil,
    wherein at least the part of the first end of the first ignition coil is placed on an extension of the second exhaust port in a direction orthogonal to an opening surface of the second exhaust port.

2. The vehicle according to claim 1, wherein the cylinder head is placed at a side of the exhaust duct, and
    the second exhaust port opens toward the side of the exhaust duct.

3. The vehicle according to claim 1, further comprising an engine exhaust duct configured to exhaust a gas within the engine to outside of the engine, wherein the first exhaust port is configured to exhaust the gas within the case of the continuously variable transmission to the engine exhaust duct.

4. A vehicle comprising:
    an engine having a cylinder head and a first ignition coil with a first end exposed from the cylinder head;
    a continuously variable transmission (CVT) that varies and outputs rotary power from the engine;
    a case surrounding the CVT, and
    an exhaust duct connected to the case, having a first exhaust port configured to exhaust a gas within the case to outside of the case, and a second exhaust port configured to exhaust a part of the gas flowing to the first exhaust port to outside of the case,
    wherein the second exhaust port is further configured to exhaust the gas within the case to at least a part of the first end of the first ignition coil,
    wherein the exhaust duct has a projecting portion projecting outward from an outer circumferential surface thereof and provided above the second exhaust port, and
    wherein at least a part of the projecting portion is at the same height as that of at least the part of the first ignition coil.

5. The vehicle according to claim 4, wherein at least a part of the projecting portion overlaps with the cylinder head in a top view.

6. A vehicle comprising:
    an engine having a cylinder head and a first ignition coil with a first end exposed from the cylinder head;

a continuously variable transmission (CVT) that varies and outputs rotary power from the engine;
a case surrounding the CVT, and
an exhaust duct connected to the case, having a first exhaust port configured to exhaust a gas within the case to outside of the case, and a second exhaust port configured to exhaust a part of the gas flowing to the first exhaust port to outside of the case,
wherein the second exhaust port is further configured to exhaust the gas within the case to at least a part of the first end of the first ignition coil,
wherein the exhaust duct has a projecting portion projecting outward from an outer circumferential surface thereof and provided above the second exhaust port, and
wherein the projecting portion has a tubular shape forming at least a part of an edge of the second exhaust port,
wherein the exhaust duct has a front portion extending diagonally upward toward a rear side from the case of the continuously variable transmission and a rear portion extending diagonally downward toward the rear side from the front portion and including the first exhaust port and the second exhaust port, and
at least a part of a base end of the projecting portion is provided below a lower end of a boundary between the front portion and the rear portion.

7. The vehicle according to claim 6, wherein at least a part of the rear portion is positioned to be inclined closer to the cylinder head toward the rear side.

8. A vehicle comprising:
an engine having a cylinder head and a first ignition coil with a first end exposed from the cylinder head;
a continuously variable transmission (CVT) that varies and outputs rotary power from the engine;
a case surrounding the CVT, and
an exhaust duct connected to the case, having a first exhaust port configured to exhaust a gas within the case to outside of the case, and a second exhaust port configured to exhaust a part of the gas flowing to the first exhaust port to outside of the case,
wherein the second exhaust port is further configured to exhaust the gas within the case to at least a part of the first end of the first ignition coil, and
wherein the exhaust duct has a front portion extending diagonally upward toward a rear side from the case of the continuously variable transmission and a rear portion extending diagonally downward toward the rear side from the front portion and including the first exhaust port and the second exhaust port.

9. A vehicle comprising:
an engine having a cylinder head and a first ignition coil with a first end exposed from the cylinder head;
a continuously variable transmission (CVT) that varies and outputs rotary power from the engine;
a case surrounding the CVT, and
an exhaust duct connected to the case, having a first exhaust port configured to exhaust a gas within the case to outside of the case, and a second exhaust port configured to exhaust a part of the gas flowing to the first exhaust port to outside of the case,
wherein the second exhaust port is further configured to exhaust the gas within the case to at least a part of the first end of the first ignition coil, and
wherein an area of an opening surface of the second exhaust port when the opening surface is seen from a direction orthogonal to the opening surface is smaller than an area of an opening surface of the first exhaust port.

10. A vehicle comprising:
an engine having a cylinder head and a first ignition coil with a first end exposed from the cylinder head;
a continuously variable transmission (CVT) that varies and outputs rotary power from the engine;
a case surrounding the CVT, and
an exhaust duct connected to the case, having a first exhaust port configured to exhaust a gas within the case to outside of the case, and a second exhaust port configured to exhaust a part of the gas flowing to the first exhaust port to outside of the case,
wherein the second exhaust port is further configured to exhaust the gas within the case to at least a part of the first end of the first ignition coil, and
wherein the engine having the cylinder head further includes a second ignition coil juxtaposed to the first ignition coil, and at least part of the first end of the first ignition coil and at least part of a first end of the second ignition coil are placed on an extension of the second exhaust port in a direction orthogonal to an opening surface of the second exhaust port,
wherein the cylinder head has a groove in a direction in which the first ignition coil and the second ignition coil are juxtaposed, and
the first end of the first ignition coil and the first end of the second ignition coil are exposed in a region in which the cylinder head groove is provided.

* * * * *